April 10, 1951      K. M. ARMANTROUT      2,548,761
TRANSMISSION INTERLOCK MECHANISM Filed March 26, 1947      2 Sheets-Sheet 1

Inventor:
Kenneth M. Armantrout

April 10, 1951 K. M. ARMANTROUT 2,548,761
TRANSMISSION INTERLOCK MECHANISM
Filed March 26, 1947 2 Sheets-Sheet 2

Inventor:
Kenneth M. Armantrout
By Edward ...
Atty.

Patented Apr. 10, 1951

2,548,761

UNITED STATES PATENT OFFICE 2,548,761

TRANSMISSION INTERLOCK MECHANISM

Kenneth M. Armantrout, Muncie, Ind., assignor to Borg-Warner Corporation, Chicago, Ill., a corporation of Illinois Application March 26, 1947, Serial No. 737,278

6 Claims. (Cl. 74—781)

My invention relates to transmissions and more particularly to interlocking mechanism for transmissions.

Countershaft transmissions having overdrive planetary transmissions connected in tandem therewith are in common use. The countershaft transmissions generally include a shiftable gear which is shifted in one direction for a forward low speed drive and is shifted in the opposite direction for a reverse drive. The planetary overdrive transmissions generally include a pawl which engages with a slotted element in order to provide the overdrive speed ratio through the planetary gearing. Various interlocking mechanisms have been provided between the shiftable gear and the pawl in order to prevent the pawl from shifting into engagement with the slotted element when the slidable gear is positioned for reverse drive; however, such interlocking mechanisms have included various slidable bolts and the interlocking mechanisms have been quite complicated and correspondingly expensive to manufacture.

It is an object of the present invention to provide an improved interlocking mechanism between the shiftable gear in the countershaft transmission and the pawl in the overdrive. To this end, it is an object to provide a slot in the overdrive pawl adapted to receive a land on a slidable rod which moves with the slidable gear in the countershaft transmission, with the arrangement being such that the land enters the slot in the pawl when the shiftable gear is moved into its reverse position. I contemplate that the shiftable rod movable with the forward and reverse slidable gear in the countershaft transmission shall be simply a round rod and that the land may be simply an enlarged annular portion of that rod.

The invention consists of the novel constructions, arrangements and devices to be hereinafter described and claimed for carrying out the above stated objects and such other objects as will appear from the following description of a certain preferred embodiment of the invention illustrated with reference to the accompanying drawings wherein:

Like characters of reference designate like parts in the several views.

Figure 1:
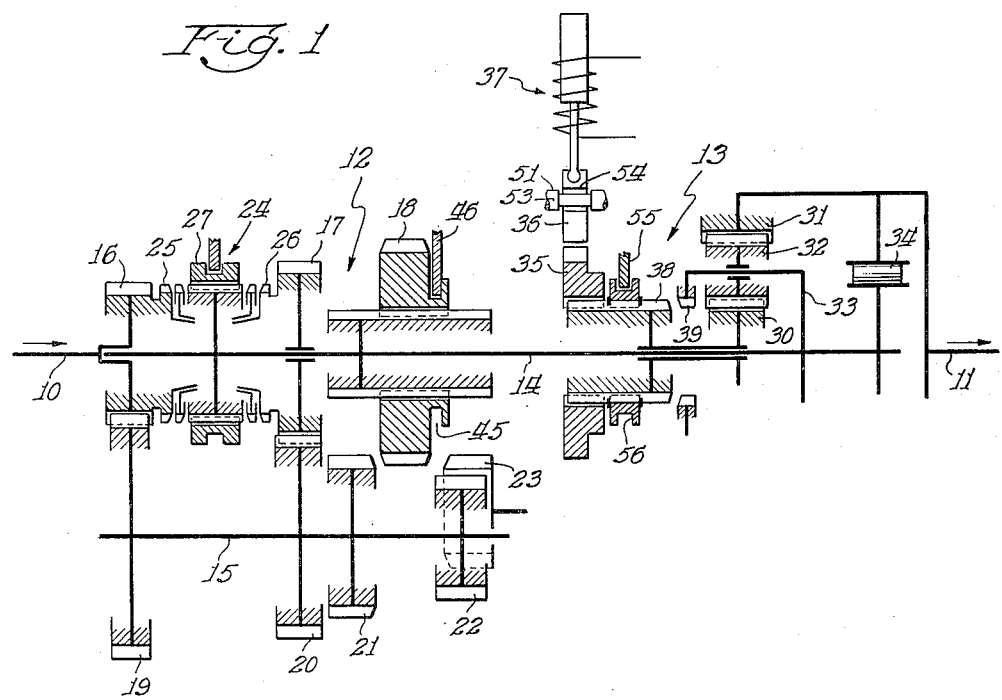
Fig. 1 is a diagrammatic illustration of a countershaft transmission having an overdrive planetary type transmission connected in tandem therewith.

Referring now to the drawings and to Fig. 1 in particular, the illustrated transmission comprises an input shaft 10, an output shaft 11, a countershaft type transmission 12 and a planetary overdrive transmission 13 which are connected between the shafts 10 and 11 with the transmission 13 being disposed behind the transmission 12.

The countershaft transmission comprises the input shaft 10, a driven shaft 14 and a countershaft 15. A gear 16 is fixed on the shaft 10. A gear 17 is rotatably mounted on the driven shaft 14 and a gear 18 is splined on this shaft. Gears 19, 20, 21 and 22 are fixed on the countershaft 15. The gear 19 is constantly in mesh with the gear 16 and the gear 20 is constantly in mesh with the gear 17. An idler gear 23 is constantly in mesh with the countershaft gear 22, and the slidable transmission gear 18 is adapted to mesh either with the countershaft gear 21 or with the idler gear 23.

A positive clutch 24 is provided between the driven shaft 14 and the gears 16 and 17. This clutch comprises clutch teeth 25 and 26 fixed respectively with the gears 16 and 17 and a collar 27 slidably splined with respect to the driven shaft 14. The collar 27 when moved to the left as seen in Fig. 1 engages with the teeth 25 to couple the gear 16 with respect to the shaft 14 and when moved to the right to fix the gear 17 with respect to the shaft 14.

The countershaft transmission 12 provides between the input shaft 10 and the driven shaft 14 three speeds in forward drive and one speed in reverse. The slidable gear 18 when moved into mesh with the countershaft gear 21 provides a low speed forward drive which proceeds through the gears 16, 19, 21 and 18. Second speed forward drive is provided by moving the collar 27 to the right as seen in Fig. 1 to mesh with the teeth 26, and this drive is through the gears 16, 19, 20 and 17 and the clutch 24. Third speed or direct drive is provided when the collar 27 is moved to the left as seen in Fig. 1 to mesh with the teeth 25 and this drive is directly from the shaft 10 to the shaft 14 through the clutch 24. Reverse drive is provided by moving the gear 18 into mesh with the idler gear 23, and this drive proceeds through gears 16, 19, 22, 23 and 18.

The planetary overdrive transmission comprises planetary gearing which includes a sun gear 30, a ring gear 31, a plurality of planet gears 32 (one being shown in the drawing) in mesh with the gears 30 and 31 and a planetary gear carrier 33. The ring gear is connected with the output shaft 11 and the gear carrier 33 is connected with the driven shaft 14 of the countershaft transmission which constitutes the driving shaft of the planetary gearing 13.

A one-way roller clutch 34 is connected directly between the shafts 14 and 11. Rotation of the sun gear 30 is controlled by means of a slotted element 35 connected with the sun gear and a pawl 36 adapted to engage the slotted element. The slotted element and pawl constitute a positive type brake for the sun gear 30. The pawl is controlled by means of an electric solenoid 37. The sun gear 30 is slidable longitudinally and has formed thereon a plurality of teeth 38 which are adapted to intermesh with a plurality of teeth 39 provided on the gear carrier 33. The teeth 38 and 39 constitute a positive type clutch for locking up the planetary gear set so that only a two-way direct drive may be transmitted between the shafts 14 and 11.

The overdrive transmission 13 functions to provide between the shafts 14 and 11 a one-way drive, an overdrive, or a two-way direct drive. The one-way drive proceeds through the one-way clutch 34 when the pawl 36 is disengaged and the clutch teeth 38 and 39 are disengaged. Overdrive is obtained when the pawl 36 is engaged with the slotted element 35 due to energization of the solenoid 37 for thereby holding the sun gear 30 stationary. The drive in this case is from the planetary gear carrier through the planet gears 32 and the ring gear 31 to the output shaft 11, and the sun gear 30 acts as the reaction element. A two-way direct drive is obtained by shifting the sun gear 30 longitudinally to engage the teeth 38 and 39, and this locks up the gears of the planetary gearing together.

The countershaft transmission and planetary transmission combinations as so far described are in common everyday use, and further details of their constructions are hence believed not necessary.

Figure 4:
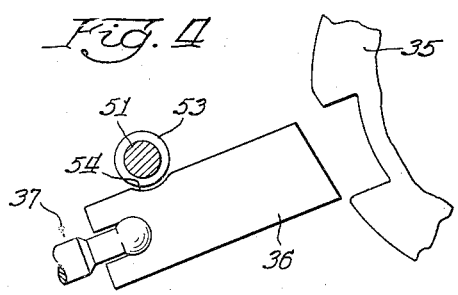
Fig. 4 is a sectional view on an enlarged scale taken on line 4—4 of Fig. 2.
Figure 2:
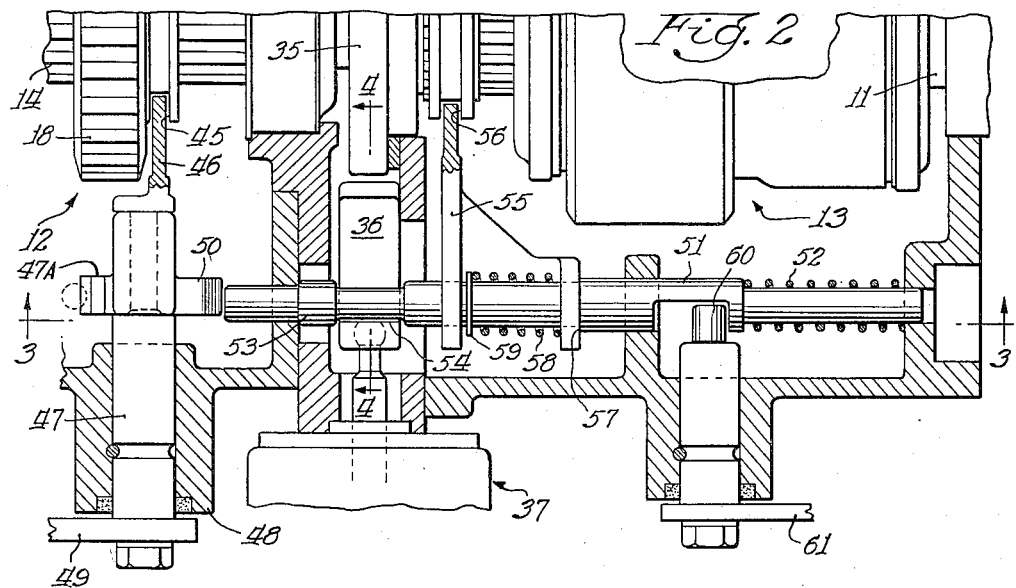
Fig. 2 is a sectional view of a portion of the transmission illustrated in Fig. 1 showing the interlocking mechanism between the slidable gear in the countershaft transmission and the pawl in the overdrive.
Figure 3:
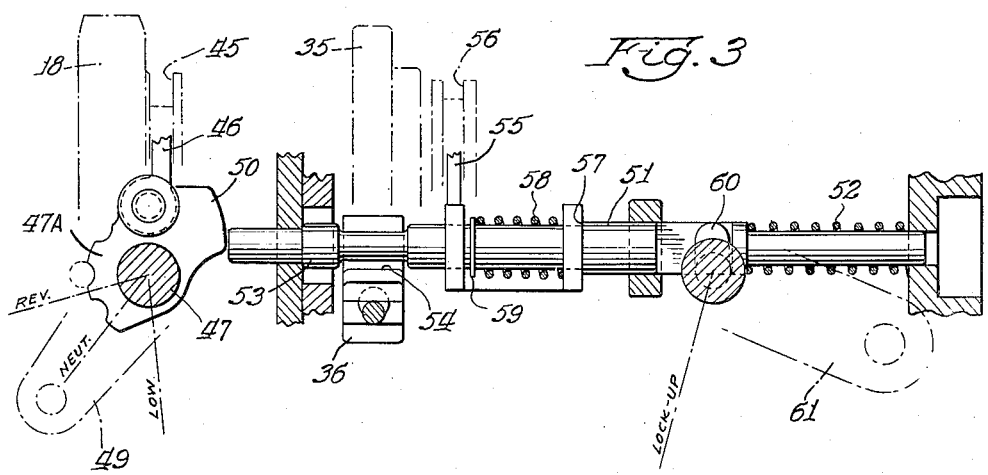
Fig. 3 is a sectional view taken on line 3—3 of Fig. 2.

The controls for the slidable sun gear 30, the slidable gear 18 in the countershaft transmission and the interlock for the pawl 36 are shown in Figs. 2, 3 and 4. The gear 18 is provided with a channel 45 which receives a shift fork 46. This shift fork is carried by a lever 47A mounted on a shaft 47 oscillatably disposed in the transmission casing 48. A control lever 49 is fixed on the outer end of the shaft 47. A cam 50 is provided on the lever 47A.

An interlock shaft 51 is slidably disposed in the transmission casing 48, and this shaft bears on and is actuated by the cam 50. A spring 52 is provided between a shoulder on the shaft 51 and the casing 48 and functions to yieldingly hold the shaft in engagement with the cam 50. The shaft 51 is provided with an annular land 53 which is adapted to engage with the pawl 36 by entering into a circular groove or slot 54 in the pawl. The rod 51 is circular in cross section throughout its length, with an exception to be noted later, and the land 53 is also circular in cross section. The slot 54 in the pawl 36 is also circular so that the land 53 may enter directly into the slot 54 when the interlock shaft 51 is moved to the right as seen in Fig. 2. The land 53 and the slot 54 in the pawl 36 constitute an interlock the operation of which will be described hereinafter.

The shaft 51 carries a fork 55 which fits in a groove 56 provided in the sun gear 30. An extension of the fork 55 normally bears against a shoulder 57 on the rod 51 and the fork is yieldingly held in this position by means of a spring 58 which is disposed between the fork and a spring ring 59 anchored in the rod 51.

A shift lever 60 is provided for shifting the rod 51 exclusive of any such shifting by means of the cam 50. This lever 60 at its inner end extends into a notch in the interlock rod 51 and has a shift lever 61 fixed thereto at its outer end whereby the lever 60 may be actuated.

When the levers 49 and 47A are shifted so as to move the slidable gear 18 to the right as seen in the figures to its reverse position, the cam 50 functions to shift the interlock rod 51 in the same direction so as to move the land 53 into the notch 54 of the pawl 36. The pawl 36 is thereby held from movement into engagement with the slotted element 35. Such movement of the rod 51 also functions to move the fork 55 by means of the spring 58 and thereby to move the sun gear 30 to the right to bring the teeth 38 and 39 into engagement. Such engagement of these teeth functions to lock up the planetary gear set so that there is a two-way direct drive between the shafts 14 and 11. The driven shaft 11 may then be driven in reverse.

The interlock rod 51 may be moved to the right also by means of the shift levers 60 and 61, exclusive of any movement of the shift levers 49 and 47A. This is for the purpose of locking up the planetary gear set so that the one-way clutch 34 cannot release when the transmission is in any of its forward drives. The shift lever 61 may be connected with a control (not shown) on the dashboard of the vehicle in order to put this control within access of the vehicle operator. The lever 61 is simply shifted and this movement functions to move the interlock rod 51 to the right as seen in the figures to cause the same locking up of the pawl 36 and engagment of the clutch teeth 38 and 39 all as has been previously described in connection with the movement of the interlock rod 51 by means of the shift levers 49 and 47A.

The interlock comprising the annular land 53 adapted to enter the circular slot 54 in the pawl 36 also has the function of preventing the countershaft transmission 12 from being shifted into its reverse drive condition if the pawl 36 happens to be stuck in its inmost, engaged position. The rear edge of the land 53 will contact an edge of the pawl 36 to prevent movement of the interlock rod 51 when the pawl 36 is in its engaged position, so that the cam 50 together with the lever 49, shaft 47, lever 47A and the gear 18 cannot be moved into their reverse drive positions. If, due to some failure of the solenoid 37, the pawl 36 is not retracted properly when the vehicle comes to a stop, absence of this interlock would allow the gear 18 to mesh with the idler 23 so that the shaft 14 would tend to have a reverse rotation and give the planetary gear set the same rotation under such circumstances. The one way clutch 34 would engage, since this clutch is of such construction as to drive the driven shaft from the shaft 14 in the forward direction, and there would be the effect of having the overdrive unit in two gears at once, thereby making the vehicle unmovable in the rearward direction. Under these conditions, breakage of some of the overdrive parts could be expected. Therefore, since the interlock land 53 will prevent the vehicle driver from getting into reverse if the pawl 36 happens to be stuck in its engaged position, the interlock will thus prevent the driver from applying power through the overdrive and thereby damaging various overdrive parts.

My improved interlock comprising the annular land 53 cooperating with the circular groove 54 constitutes an economically manufactured interlock for preventing movement of the pawl 36 either when the transmission assembly is conditioned for reverse or when the control lever 61 is actuated for providing a locked drive through the overdrive unit or for preventing a shifting of the transmission assembly into reverse if the pawl is not in its engaged position. No bolts or any flanges formed on the interlock rod 51 are required between the rod 51 and the groove 54 in order to obtain the desired interlocking function between the rod and pawl.

I wish it to be understood that my invention is not to be limited to the specific constructions or arrangements shown and described, except only insofar as the claims may be so limited, as it will be apparent that modifications may be made without departing from the principles of the invention.

I claim:

1. In transmission mechanism, the combination of a drive shaft, a driven shaft, gearing for providing a power train between said shafts and including an engaging device for completing the power train when engaged, said engaging device including a slotted element and a pawl adapted to enter the slotted element to engage therewith, and means for selectively locking said pawl from movement and including a longitudinally movable interlock rod having a land thereon, said pawl having a groove therein for receiving said land on longitudinal movement of said rod whereby the pawl is locked from movement.

2. In transmission mechanism, the combination of a drive shaft, a driven shaft, gearing for providing a power train between said shafts and including an engaging device for completing the power train when engaged, said engaging device including a slotted element and a pawl adapted to enter the slotted element to engage therewith, and means for selectively locking said pawl from movement and including a longitudinally movable interlock rod having a land thereon, said interlock rod and said land being circular in cross section, said pawl having a circular groove therein for receiving said land on longitudinal movement of said rod whereby the pawl is locked from movement.

3. In transmission mechanism, the combination of a drive shaft, a driven shaft, gearing for providing a power train between said shafts and including an engaging device for completing the power train when engaged, said engaging device including a slotted element and a pawl adapted to enter the slotted element to engage therewith, and means for selectively locking said pawl from movement and including a longitudinally movable interlock rod having a land thereon, said interlock rod being round in cross section and the cross section of said land being such that peripheral portions of the land at opposite edges of the land are equidistant from the center of the rod, said pawl having a groove therein similar in cross section to said land for receiving the land on longitudinal movement of said rod whereby the pawl is locked from movement.

4. In transmission mechanism, the combination of a drive shaft, a driven shaft, planetary gearing for providing a power train between said shafts and including a reaction member for completing the power train when held stationary, a brake for said reaction member and including a slotted element on the reaction element and a pawl adapted to engage the slotted element, a clutch for locking up the elements of said planetary gearing to prevent relative movements between the elements, said pawl having a groove therein, and a longitudinally movable interlock rod having a land thereon adapted to enter the groove on longitudinal movement of the rod for holding the pawl from movement and being connected with said clutch for actuating the clutch.

5. In transmission mechanism comprising gearing and a slotted element connected to an element of the gearing for providing when braked a power train between driving and driven shafts, the combination of a pawl adapted to engage the slotted element, and a longitudinally movable interlock rod having a land thereon, said pawl having a groove therein for receiving said land on longitudinal movement of the rod whereby the pawl is locked from movement.

6. In transmission mechanism comprising gearing and a slotted element connected to an element of the gearing for providing when braked a power train between driving and driven shafts, the combination of a pawl adapted to engage the slotted element, and means for selectively locking said pawl from movement and including a longitudinally movable interlock rod having a land thereon, said interlock rod and said land being circular in cross section and said pawl having a circular groove therein for receiving said land on longitudinal movement of said rod whereby the pawl is locked from movement.

KENNETH M. ARMANTROUT.

REFERENCES CITED

The following references are of record in the file of this patent:

UNITED STATES PATENTS

| Number | Name | Date |
|---|---|---|
| 1,147,877 | Masory | July 27, 1915 |
| 1,914,255 | Hodgkins | June 13, 1933 |
| 2,243,111 | McFarland | May 27, 1941 |
| 2,323,340 | McFarland | July 6, 1943 |